United States Patent [19]

Malloy

[11] Patent Number: 4,959,528
[45] Date of Patent: Sep. 25, 1990

[54] ELECTRICALLY HEATED VESSEL AND BASE UNIT FOR USE IN A MOTOR VEHICLE

[76] Inventor: John R. Malloy, 2516 SW. Burnett Rd., Topeka, Kans. 66694

[21] Appl. No.: 318,116

[22] Filed: Mar. 2, 1989

Related U.S. Application Data

[63] Continuation of Ser. No. 86,963, Aug. 19, 1987, abandoned.

[51] Int. Cl.⁵ .......................... H05B 1/00; H05B 1/02; A47J 41/00; F24H 1/06
[52] U.S. Cl. .................................. 219/432; 219/202; 219/436; 219/517
[58] Field of Search ................................ 219/310–312, 219/429–433, 436–438, 441, 442, 202, 517

[56] References Cited

U.S. PATENT DOCUMENTS

| | | | |
|---|---|---|---|
| 1,393,751 | 10/1921 | Chapin | 219/432 |
| 2,269,689 | 1/1942 | Reichold | 219/441 X |
| 2,282,866 | 5/1942 | Hagen | 219/242 X |
| 2,543,052 | 2/1951 | Park | 219/432 X |
| 2,560,214 | 7/1951 | Cameron | 219/432 X |
| 2,680,190 | 6/1954 | Schmidt | 219/432 |
| 2,863,037 | 12/1958 | Johnstome | 219/436 X |
| 3,405,899 | 10/1968 | Trachtenberg et al. | 219/202 X |
| 3,429,252 | 2/1969 | Colonna | 219/202 X |
| 3,662,155 | 5/1972 | Komazaki et al. | 219/432 |
| 3,915,079 | 10/1975 | Balderson | 219/432 X |

FOREIGN PATENT DOCUMENTS

| | | | |
|---|---|---|---|
| 207452 | 4/1957 | Australia | 219/432 |
| 231391 | 12/1960 | Australia | 219/441 |
| 684177 | 11/1939 | Fed. Rep. of Germany | 219/433 |
| 19347 | 9/1914 | France | 219/432 |

*Primary Examiner*—Anthony Bartis
*Attorney, Agent, or Firm*—D. A. N. Chase; Joan Optican Herman

[57] ABSTRACT

A portable, self heating, container assembly for use in a motor vehicle includes an electrically heated double-walled insulated vessel having a lower end portion telescopically, rotatably and removably received in a tubular socket of a separate base unit. The socket bottom has a pair of electrical contacts connected through a power switch and fuse to a power cord adapted to be plugged into the vehicle cigarette lighter socket. The pair of contacts are engageable with cooperating electrical contacts on the vessel bottom for energization of the heating element upon the vessel being received in the recessed in the socket. The vessel bottom and socket have cooperating spaced, interengageable radial locking flanges arranged to securely lock the vessel and base unit together upon rotation of the vessel relative to the base unit after the lower end portion of the vessel is placed in to the socket.

8 Claims, 1 Drawing Sheet

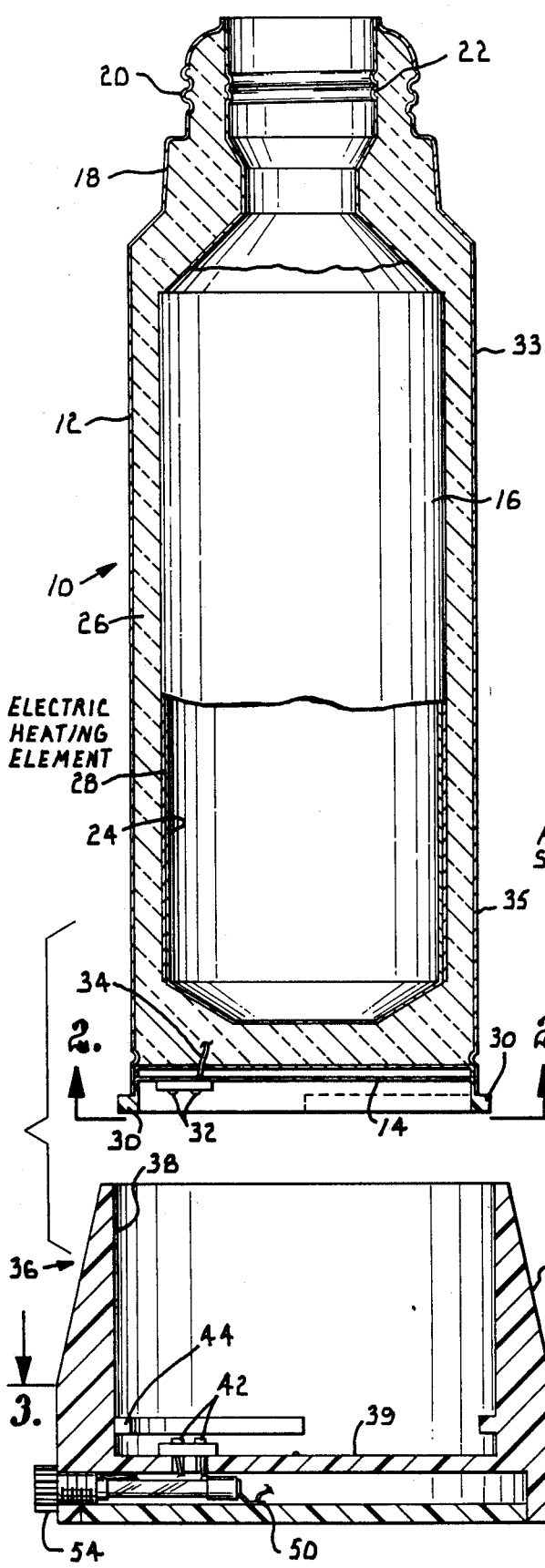
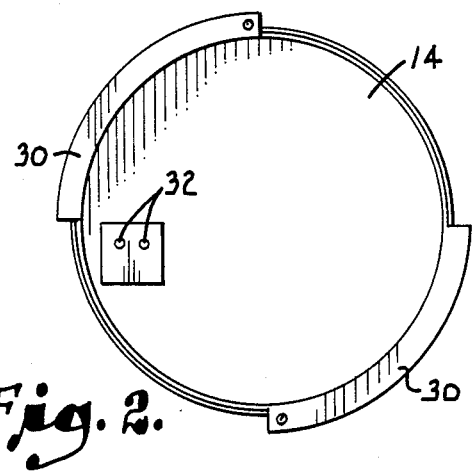
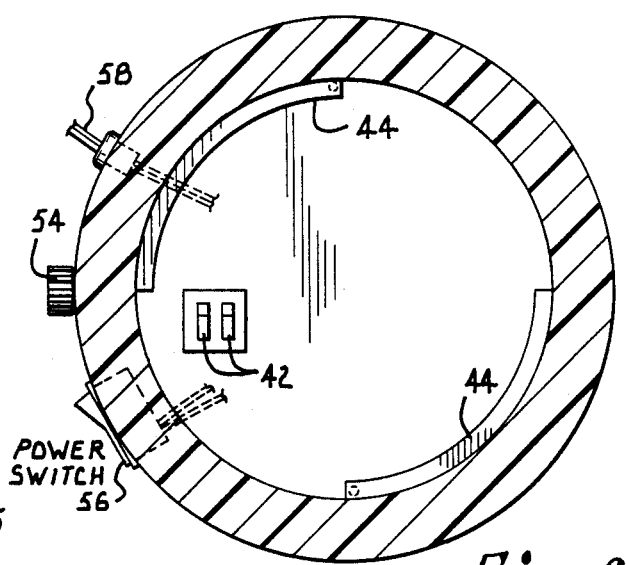
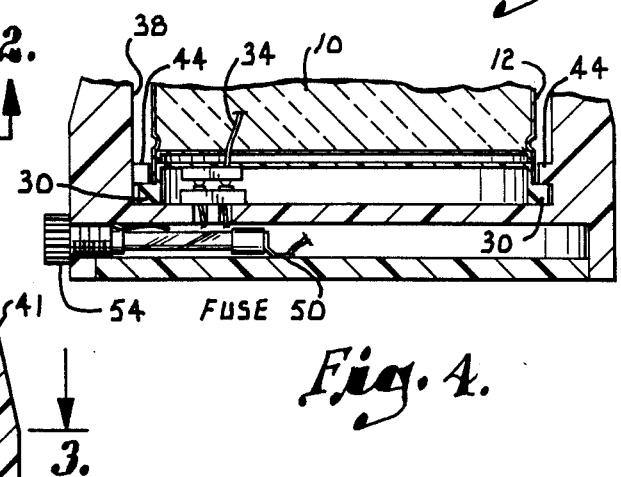

1

ELECTRICALLY HEATED VESSEL AND BASE UNIT FOR USE IN A MOTOR VEHICLE

This application is a continuation of application Ser. No. 086,963, filed Aug. 19, 1987 and now abandoned.

BACKGROUND OF THE INVENTION

The invention relates to a portable, self-heating, insulated container assembly which is able to raise and maintain the temperature of a liquid within the container for an indefinite period of time, and which is adapted to utilize the on-board power source of an automotive vehicle.

Insulated of Thermos-type containers for liquids are well known in the prior art. These insulated containers, however, are not well adapted for use over long periods of time. This becomes a problem in activities such as long distance automotive travel. After a few hours, the temperature of the contents, typically a beverage such as hot coffee, tends to decrease to an undesirable level. There is, therefore, a need to heat the contents of insulated containers and maintain these contents in a heated condition at a desired degree of temperature over extended periods of time.

SUMMARY OF THE INVENTION

It is, therefore, the primary object of the present invention to provide a self-heating container assembly which is readily portable and which can utilize the on-board power source of an automotive vehicle.

It is another object of the present invention to provide an assembly as aforesaid that utilizes a container and a separate base to which electrical power is supplied, wherein the container may be removed from the base during use and installed in the base during nonuse to maintain the contents in a heated condition.

It is a further object of the present invention to Provide a self-heating container assembly with a container and a separable base both having electrical contacts, where the container can be received within the base to close the electrical contacts and create an electrical circuit to energize a heating element. The energized heating element then heats the contents of the container and maintains the same at a desired temperature.

Other objects and advantages of this invention will become apparent from the following description taken in connection with the accompanying drawings, wherein is set forth by way of illustration and example, an embodiment of this invention. The present invention provides a self-heating container unit which is readily portable, and which is adapted to plug into the on-board power source of a motor vehicle. The integrated unit of the present invention includes a vessel for receiving the liquid contents and a double walled, thoroughly insulated selectively detachable tubular base for receiving the vessel. When this portable unit is secured together, electrical contacts on both the vessel and the base are registered to create an electrical circuit to energize an electrical heating element. This energized heating element surrounds the inner chamber of the vessel to heat the contents of the container, and can maintain said contents at a desired temperature for an indefinite amount of time. The outer wall of the vessel is reduced at the upper portion thereof and has threads thereon for receiving a suitable cap assembly, which cap can also function as cup means.

BRIEF DESCRIPTION OF THE DRAWINGS

FIG. 1 is an exploded, vertical cross-section of the self-heating container assembly.

FIG. 2 is a bottom plan view taken along line 2—2 of FIG. 1.

FIG. 3 is a horizontal cross-section taken along line 3—3 on FIG. 1 and looking downwardly.

FIG. 4 is a fragmentary, vertical cross-section of the bottom portion of the self-heating container assembly showing the container installed within the base.

DESCRIPTION OF THE PREFERRED EMBODIMENT

Referring to FIG. 1, a self-heating container assembly is comprised of a generally cylindrical thermos-type container or vessel generally designated 10, and a base generally designated 36. The vessel 10 has an outer wall 12 spaced from an inner line 24 defining an inner chamber 16 which, during use, would typically be filled with a beverage such as hot coffee. Vessel 10 further has a normally upper end portion 33 and lower end portion 35, the lower end portion 35 presenting a bottom 14 of the vessel 10. A circumscribing layer of insulation 26 is sandwiched between the outer wall 12 and the inner liner 24 to insulate and thereby maintain the temperature of the contents of the chamber 16. The outer wall 12 is reduced at the upper neck portion 18 thereof, and has outer threads 20 for receiving a cap or drinking cup (not shown). Likewise, the inner liner 24 is reduced at the upper portion thereof and has inner threads 22 thereon for receiving a suitable stopper (not shown). An electrical heating element 28 overlies and is in contact with the outer surface of liner 24.

The bottom 14 of vessel 10 has a pair of electrical contacts 32 thereon. Electrical leads 34 interconnect the electrical contacts 32 with electric element 28 on the liner 24. A pair of spaced, radially projecting, arcuate flanges 30 are located on the bottom 14 of the vessel 10. These flanges 30 project outwardly and each extends approximately 90 degrees around the periphery of outer wall 12, with the flanges 30 being diametrically opposed.

The base 36 has tubular inner wall 38 which presents a socket having a closed lower end 39 and an open upper end 41. When the base 36 receives the bottom 14 of the vessel 10 the electrical contacts 42 located on the lower end 39 of the base 36 selectively register with the electrical contacts 32. The tubular inner wall 38 of the base 36 is wider than the outer wall 12 of the vessel 10 and the flanges 30 thereon in order for the base 36 to receive the lower end portion 35 of the vessel 10. A pair of spaced, radially projecting, arcuate flanges 44 are located on the base 36 for engaging the flanges flanges 30 upon relative rotation of the base 36 and the received vessel bottom 14. The flanges 44 project inwardly and each extends approximately 90 degrees within the periphery the inner wall 38, with the flanges 44 being diametrically opposed.

The flanges 30 and 44 are so arranged that when the flanges 30 and the flanges 44 are rotated into engagement, the electrical contacts 32 and electrical contacts 42 move into alignment. This causes the electrical leads 34, which interconnect the electrical contacts 32 with the heating element 28, to energize the heating element 28. The heating element 28 then regulates the temperature of the contents of the vessel 10.

Referring now to FIG. 2, the flanges 30 are arcuate flanges which project radially outwardly, each extending approximately 90 degrees around the periphery of the outer wall 12 of the vessel bottom 14. Electrical contacts 32 are located on the vessel bottom 14.

Referring now to FIG. 3, the flanges 44 are arcuate flanges which project radially inwardly, each extending approximately 90 degrees within the periphery of the inner wall 38 of the base 36. The electrical contacts 42 are located on the base 36. The flanges 30 and the flanges 44 are interengageable for selectively securing the vessel 10 with the base 36 as is shown in FIG. 4. Power switch 56 is located on the base 36, and power cord 58 interconnects the electrical contacts 42 with a suitable power source (not shown).

Referring now to FIG. 4, the self-heating container assembly is shown with the bottom 14 of the vessel 10 received by the base 36. The flanges 30 are shown engaged with the flanges 44. This engagement causes the electrical contacts 32 and the electrical contacts 42 to be in alignment, creating an electrical circuit by connecting the electrical leads 34 with a power source (not shown). This circuit energizes the heating element 28, and the heating element 28 is then able to heat the vessel contents and maintain them in a heated condition. The vessel contents may be any of a variety of edible materials, including beverages such as hot coffee and hot tea. A fuse 50 is located within base 36 and is held in place by a screw-in fuse holder 54, as shown in FIG. 4.

Any suitable heating element may be used to heat and maintain the contents in a heated condition. In one example, the heating element 28 is an HWAT TM heating element manufactured by Raychem Corporation of Menlo Park, Calif. The HWAT TM heating element is a heater strip consisting of a semi-conductive polymeric core which is extruded between two copper bus wires. The heater strip is self-regulating, to continually increase and decrease its temperature as needed to maintain a virtually constant temperature. Any heating element which is used should be able to maintain the contents at a specified temperature. A desirable temperature would be in the range of 105° F. to 140° F.

Any suitable power source may be employed. However, it is contemplated in the present invention that the power cord 58 may be connected to the cigarette lighter of an automobile or a truck, or any other similar vehicular power source. Thus, the self-heating container assembly is particularly adapted for use when travelling by motor vehicle over long distances.

It is to be understood that while certain forms of this invention have been illustrated and described, it is not limited thereto, except insofar as such limitations are included in the following claims.

Having thus described the invention, what is claimed as new and desired to be secured by Letters Patent is:

1. A self-heating container assembly comprising:

an elongated, hand-portable vessel having an outer wall, a chamber therein, and a lower portion including a bottom;

a liner in said vessel chamber, said liner being provided with an electric heating element and defining an inner chamber adapted to receive the material to be heated;

insulation between said outer wall and said liner sufficient to maintain the temperature of the material to be heated at a desired temperature;

first electrical contacts on said bottom with electrical lead means interconnecting said contacts and said heating element;

a detachable, tubular base having an open upper end and a closed lower end, and presenting a tubular socket for coaxially and telescopically rotatably receiving a substantial portion of a longitudinal extent of said lower portion of said vessel, with said lower portion spaced apart from an inner wall of said socket of said base when received therein and adapted to provide clearance for said vessel when said vessel is positioned within said socket, said socket having second electrical contacts therein registering with said first electrical contacts when said lower portion of said vessel is received by said socket;

means for connecting said second electrical contacts with a power source; and interengageable locking parts on said bottom of said vessel and said base for securing the same together upon said vessel bottom being received in said base and said bottom and said base being rotated coaxially relative to each other, whereby said vessel may be selectively interlocked within said base with said first and second contacts engaged to energize said heating element and maintain the vessel contents in a heated condition.

2. A self-heating container assembly comprising:

an elongated, hand-portable vessel having an outer wall, a chamber therein, and a lower portion including a bottom;

a liner in said vessel chamber, said liner being provided with an electric heating element and defining an inner chamber adapted to receive the material to be heated;

insulation between said outer wall and said liner sufficient to maintain the temperature of the material to be heated at a desired temperature;

a pair of spaced, radially projecting, first flanges on said bottom of said vessel;

first electrical contacts on said bottom with electrical lead means interconnecting said contacts and said heating element;

a detachable, tubular base having an open upper end and a closed lower end, and presenting a tubular socket for coaxially and telescopically rotatably receiving a substantial portion of a longitudinal extent of said lower portion of said vessel, with said lower portion spaced apart from an inner wall of said socket of said base when received therein and adapted to provide clearance for said vessel when said vessel is positioned within said socket, said socket having second electrical contacts therein registering with said first electrical contacts when said lower portion of said vessel is received by said socket;

means for connecting said second electrical contacts with a power source; and a pair of spaced, radially projecting, second flanges on said socket inner wall arranged to engage said first flanges upon relative coaxial rotation of said base and received vessel lower portion, whereby said vessel may be selectively interlocked within said socket with said first and second contacts engaged to energize said heating element and maintain the vessel contents in a heated condition.

3. The self-heating container assembly as claimed in claim 2, wherein said first flanges are arcuate flanges which project outwardly, and each extend approximately 90 degrees around the periphery of said outer wall, said first flanges being diametrically opposed.

4. The self-heating container assembly as claimed in claim 2, wherein said second flanges are arcuate flanges which project inwardly, and each extend approximately 90 degrees within the periphery of the inner wall of said socket said second flanges being diametrically opposed.

5. A self-heating container assembly comprising:
   an elongated, hand-portable vessel having an outer wall, a chamber therein, and a lower portion including a bottom;
   a liner in said vessel chamber defining an inner chamber for receiving material to be heated and provided with an electric heating element, said liner being reduced at the upper portion thereof;
   said outer wall of said vessel being reduced at the upper portion thereof and provided with threads on said upper portion for receiving suitable cap means;
   insulation between said outer wall and said liner sufficient to maintain the temperature of the material to be heated at a desired temperature;
   said bottom of said vessel being provided with a pair of spaced, radially projecting first flanges, wherein said first flanges are arcuate flanges which project outwardly, and each extend approximately 90 degrees around the periphery of said outer wall, said first flanges being diametrically opposed;
   first electrical contacts on said bottom with electrical lead means interconnecting said contacts and said heating element;
   a detachable, tubular base having an open upper end and a closed lower end, and presenting a tubular socket for coaxially and telescopically rotatably receiving a substantial portion of a longitudinal extent of said lower portion, said lower portion spaced apart from an inner wall of said socket of said base when received therein and adapted to provide clearance for said vessel when said vessel is positioned within said socket, said socket having second electrical contacts therein registering with said first electrical contacts when said lower portion of said vessel is received by said socket;
   a power switch located on said base, and a power cord connected to said second contacts through said switch and extending from said base; and
   a pair of spaced, radially projecting, second flanges on said inner wall of said socket, wherein said second flanges are arcuate flanges which project inwardly, and each extend approximately 90 degrees within the periphery of the inner wall of said socket, said second flanges being diametrically opposed, said first and second flanges being so arranged as to be capable of being brought into overlapped relationship by relative coaxial rotation of said vessel with respect to said base to interlock said vessel and said base together, whereby said vessel may be selectively secured within said socket with said first and second contacts engaged to energize said heating element and maintain the vessel contents in a heated condition.

6. A self-heating container unit for use in a vehicle comprising:
   an elongated, hand-portable vessel having an outer wall, a chamber therein, and normally upper and lower ends, said lower end presenting a bottom;
   a liner in said vessel chamber, said liner being provided with an electric heating element and defining an inner chamber adapted to receive the material to be heated;
   insulation between said outer wall and said liner sufficient to maintain the temperature of the material to be heated at a desired temperature;
   first electrical contacts on said bottom with electrical lead means interconnecting said contacts and said heating element;
   a detachable, tubular base having an open upper end and a closed lower end, and presenting a tubular socket for coaxially and telescopically rotatably receiving a substantial portion of a longitudinal extent of said lower end of said vessel, said lower end being spaced apart from an inner wall of said socket of said base when received therein and adapted to provide clearance for said vessel when said vessel is positioned within said socket, said base further having second electrical contacts at said closed end registering with said first electrical contacts when said lower portion of said vessel is received by said socket;
   means for connecting said second electrical contacts with an on-board vehicle power source; and 7. The self-heating container assembly as claimed in claim 6, wherein said interengageable locking parts include a pair of spaced, radially projecting, first flanges on said bottom of said lower end of said vessel, and a pair of spaced, radially projecting, second flanges on said closed lower end of said base, for engaging said first flanges upon relative coaxial rotation of said base and said vessel, said first flanges being arcuate flanges which project outwardly, each flange being diametrically opposed and extending approximately 90 degrees around the periphery of said outer wall, and said second flanges being arcuate flanges which project inwardly, each flange being diametrically opposed and extending approximately 90 degrees around the periphery of said inner wall of said base.

8. The self-heating container assembly as claimed in claim 7, wherein said outer wall of said vessel is reduced at the upper portion thereof, there being threads on said reduced upper portion for receiving cap means thereon.

* * * * *

UNITED STATES PATENT AND TRADEMARK OFFICE
CERTIFICATE OF CORRECTION

PATENT NO. : 4,959,528
DATED : September 25, 1990
INVENTOR(S) : John R. Malloy

It is certified that error appears in the above—identified patent and that said Letters Patent is hereby corrected as shown below:

Column 1, line 56, delete the word "thoroughly" and insert --thermally--.

Column 1, line 58, the following sentence should be inserted after the word "vessel.": --Spaced interlocking radial flanges on the vessel and on the base socket interact to selectively lock the vessel to the base upon rotation of the vessel relative to the base.--.

Column 6, line 37, as the last paragraph of claim 6, add the following paragraph:

--interengageable locking parts on said bottom of said vessel and on said inner wall of said socket adapted to secure said vessel and said base together upon relative coaxial rotation of said vessel and said base, and releasing said base from said vessel upon relative coaxial rotation of the same, whereby said vessel may be selectively interlocked with said base with said first and second contacts engaged to energize said heating element and maintain the vessel contents in a heated condition.--

Signed and Sealed this

Seventh Day of April, 1992

Attest:

HARRY F. MANBECK, JR.

*Attesting Officer*  *Commissioner of Patents and Trademarks*